(12) United States Patent
Ishijima et al.

(10) Patent No.: US 6,414,793 B1
(45) Date of Patent: Jul. 2, 2002

(54) IMAGE STABILIZING APPARATUS

(75) Inventors: Toshihisa Ishijima; Kouichi Nagata; Kenichi Takahashi, all of Omiya (JP)

(73) Assignee: Fuji Photo Optical Co., Ltd., Saitama (JP)

( * ) Notice: Subject to any disclaimer, the term of this patent is extended or adjusted under 35 U.S.C. 154(b) by 0 days.

(21) Appl. No.: 09/662,764

(22) Filed: Sep. 15, 2000

(30) Foreign Application Priority Data

Sep. 21, 1999 (JP) .......................................... 11-266712

(51) Int. Cl.[7] .............................................. G02B 27/64
(52) U.S. Cl. ........................ 359/557; 359/554; 359/407; 396/52; 396/55
(58) Field of Search .............................. 359/399, 431, 359/405–410, 831–837, 554–557; 396/52–55; 348/208

(56) References Cited

U.S. PATENT DOCUMENTS 4,313,676 A  * 2/1982 Nygaard ..................... 396/280

5,978,137 A  11/1999 Takahashi et al. .......... 359/557

FOREIGN PATENT DOCUMENTS

| EP | 834761 | | 4/1998 |
| JP | 57-37852 | | 8/1982 |
| JP | 63-53530 | * | 3/1988 |
| JP | 6-250100 | | 9/1994 |

* cited by examiner

Primary Examiner—Thong Nguyen
(74) Attorney, Agent, or Firm—Ronald R. Snider; Snider & Associates (57) ABSTRACT

In an image stabilizing apparatus in which an actuator for pivoting a gimbal suspension is driven under PWM control by way of a driving circuit, the pulse width of waveform outputted from a CPU to the driving circuit is enhanced when the power voltage $V_p$ in the driving circuit drops. The CPU reads out the power voltage $V_p$ and enhances the pulse width of output waveform from $W_1$ to $W_2$ as the power voltage $V_p$ decreases from its rated voltage $V_1$ to a lower voltage $V_2$. The correction rate $(W_2/W_1)$ is set to the reciprocal $(V_1/V_2)$ of the drop rate of power voltage $V_p$, so as to yield an appropriate actuator driving power in response to the drop in power voltage $V_p$.

4 Claims, 9 Drawing Sheets

IMAGE STABILIZING APPARATUS

RELATED APPLICATIONS

This application claims the priority of Japanese Patent Application No. 11-266712 filed on Sep. 21, 1999, which is incorporated herein by reference.

BACKGROUND OF THE INVENTION

1. Field of the Invention

The present invention relates to an image stabilizing apparatus, disposed within an optical apparatus such as monocular, binoculars, and video camera, for preventing optical images from being observed in a blurred state due to the fluctuation in emission angle of luminous flux from an observation object with respect to the optical axis of the optical apparatus when the optical apparatus is vibrated.

2. Description of the Prior Art

When an optical apparatus aimed at optical observation, such as monocular and binoculars, is operated as being held with a hand, when the optical apparatus is used in an airplane, vehicle, or the like in particular, the vibration or rocking of the airplane, vehicle, or the like is transmitted to the optical apparatus, so that the emission angle of luminous flux from an observation object with respect to the optical axis fluctuates, whereby the optical image to be observed often deteriorates. Even if the vibration transmitted to such an optical apparatus has a small amplitude, the angle of fluctuation with respect to the optical axis is enlarged since the field of view is narrow in the monocular, binoculars, and the like, and since the observation object is viewed under magnification therein. Therefore, even at the time of rocking with a relatively low angle fluctuating speed, the observation object may rapidly move within the field of view, and go out of sight when the angle of fluctuation is large, which is inconvenient. At the time of rocking with a relatively high angle fluctuating speed, on the other hand, the angle fluctuating speed of the image of observation object is observed as being increased by the power of optical apparatus even when the fluctuation angle is relatively small, whereby the image blurs and deteriorates, which is inconvenient.

Conventionally, various image stabilizing apparatus for preventing observation images from being deteriorated due to fluctuations in the emission angle of luminous flux with respect to the optical axis due to the vibration and rocking transmitted to optical apparatus have been proposed.

For example, Japanese Patent Publication No. 57-37852 discloses binoculars comprising therein anti-vibration means utilizing a rotary inertial member (gyro motor) in order to correct the blur of observation images in the binoculars.

Namely, according to this technique, an erect prism is disposed on the optical axis between an objective lens and an eyepiece of the binoculars and is secured onto gimbal suspension means, such that the erect prism is held in substantially the same posture even when the binoculars are vibrated due to camera shake or the like, so as to prevent the observation image of binoculars from blurring.

In such a conventional technique utilizing a rotary inertial member and gimbal suspension means, while images can be stabilized with a high accuracy, a high-speed rotary member is required for yielding a large inertial force within a small space, and a high precision is needed since the vibration generated by the rotary member itself has to be reduced. Such demands for smaller size, higher speed, and higher precision are problematic in that they impose inconveniences in terms of cost, life, time required for attaining a necessary inertial force after the power is turned on, and the like. If the effective diameter of objective lenses is made greater along with the increase in power or resolution of binoculars, then the erect prism becomes larger, whereby a large inertial force is required, which enhances the above-mentioned problems, and the power consumption increases along therewith.

Therefore, the assignee of the present application has proposed an image stabilizing apparatus (Japanese Unexamined Patent Publication No. 6-250100) in which an angular velocity sensor is mounted to gimbal suspension means in place of above-mentioned rotary inertial member, and the pivoting of the gimbal suspension means is controlled according to the output value from the angular velocity sensor, so as to fix the posture of the erect prism with respect to the earth (inertial system). According to this apparatus, the erect prism held with the gimbal suspension means basically has an inertial force. In particular, its posture-keeping capability against vibrations with a relatively large amplitude is high with respect to high-speed vibrations with a high vibration frequency. Therefore, the control power for the rotational position according to the angular velocity sensor can be kept small. In other image stabilizing apparatus which drive varn-angle prisms or lenses, however, active driving sections are needed, and it is necessary for the driving sections to be operated at a high speed in order to correct a large amplitude in high-frequency vibrations, whereby correction in a wide angle range is difficult.

The above-mentioned gimbal suspension means is pivoted by an actuator such as motor about two pivotal axes extending sidewise and vertical directions of the optical apparatus, respectively. The actuator is driven by PWM (Pulse Width Modulation) control, which is excellent in response and is favorable in terms of power utilization efficiency.

In the PWM control, a pulse waveform is outputted from pivoting control means to a driving circuit, and an actuator is driven with a power corresponding to the pulse width of output waveform. Consequently, there is a problem that, if the power voltage of the driving circuit drops while the apparatus is in use as in the case employing a battery power source, then the actuator driving power may decrease, whereby the aimed pivoting control cannot be carried out.

By contrast, if a regulator is disposed on the power source side of the driving circuit, so as to supply a constant voltage to the driving circuit, then the actuator driving power can be kept constant. In such a case, however, a high power type regulator is necessary when the actuator has a heavy load, which yields no merits in terms of size, heat generation, cost, and the like in small-size optical apparatus, in particular.

SUMMARY OF THE INVENTION

In view of such circumstances, it is an object of the present invention to provide an image stabilizing apparatus configured such that an actuator for pivoting gimbal suspension means is driven under PWM control by way of a driving circuit, in which, even when the power voltage of the driving circuit drops while the apparatus is in use, the actuator driving power can be kept from decreasing, so as to carry out the aimed pivoting control.

The present invention provides an image stabilizing apparatus mounted in an optical apparatus having a monocular or binocular optical system in which an erect prism is disposed between an objective lens and an eyepiece, whereas the objective lens and eyepiece of the optical system are secured within a case;

the image stabilizing apparatus comprising:

gimbal suspension means, adapted to pivotally attach the erect prism to the case, having two pivotal axes extending sidewise and vertical directions of the optical apparatus, respectively;

an actuator for pivoting the gimbal suspension means about the two pivotal axes;

pivoting control means for driving the actuator under PWM control by way of a driving circuit and controlling the pivoting of the gimbal suspension means about the two pivotal axes so as to fix the erect prism with respect to an inertial system; and pulse width correcting means for enhancing, when a power voltage of the driving circuit drops, a pulse width of a waveform outputted from the pivoting control means to the driving circuit.

Preferably, in this case, the correction rate of pulse width is set to the reciprocal of drop rate of power voltage.

While a maximum limit value is set for pulse width in PWM control in general, it is preferred that the image stabilizing apparatus further comprise maximum limit value correcting means for enhancing the maximum limit value.

Preferably, in this case, a correction rate of the maximum limit value is set to the same value as the correction rate of pulse width.

DESCRIPTION OF THE PREFERRED EMBODIMENTS

In the following, an embodiment of the present invention will be explained with reference to the drawings.

FIGS. 2 to 5 are a sectional view taken along a horizontal plane, frontal sectional view, lateral sectional view, and perspective view showing the state where the image stabilizing apparatus in accordance with an embodiment of the present invention is incorporated in binoculars, respectively. As depicted, the binoculars in which the image stabilizing apparatus 20 of this embodiment is incorporated in a case 30 comprise a pair of objective lens systems 1a, 1b; a pair of eyepiece systems 2a, 2b; and a pair of erect prisms 3a, 3b. The objective lens 1a, eyepiece 2a, and erect prism 3a constitute a first telescope system 10a. Similarly, the objective lens 1b, eyepiece 2b, and erect prism 3b constitute a second telescope system 10b. The first and second telescope systems 10a, 10b as a pair constitute a binocular system.

A pair of objective lens systems 1a, 1b and a pair of eyepieces 2a, 2b, constituting the binocular system, are secured to the case 30 of the optical apparatus. The erect prisms 3a, 3b are pivotally attached to the case 30 by way of gimbal suspension members 7, 107 having pivotal axes 6, 106 (see FIG. 6) extending in the vertical direction of the apparatus (the direction orthogonal to both the optical axis and aligning direction of objective lens systems 1a, 1b) and the sidewise direction of the apparatus (the aligning direction of objective lenses 1a, 1b), respectively.

Also, the back side of the case 30 is provided with a main switch 50 and a gain changeover instruction switch 40 which enables the switching of gain, in a control loop which will be explained later, to be operated from the outside.

In the following, fundamental functions on which the apparatus in accordance with this embodiment is based will be explained with reference to FIGS. 6 and 7. In this specification, the vertical direction of apparatus refers to the direction of arrow A in FIG. 6, whereas the sidewise direction of apparatus refers to the direction of arrow C in FIG. 6.

Figure 6:
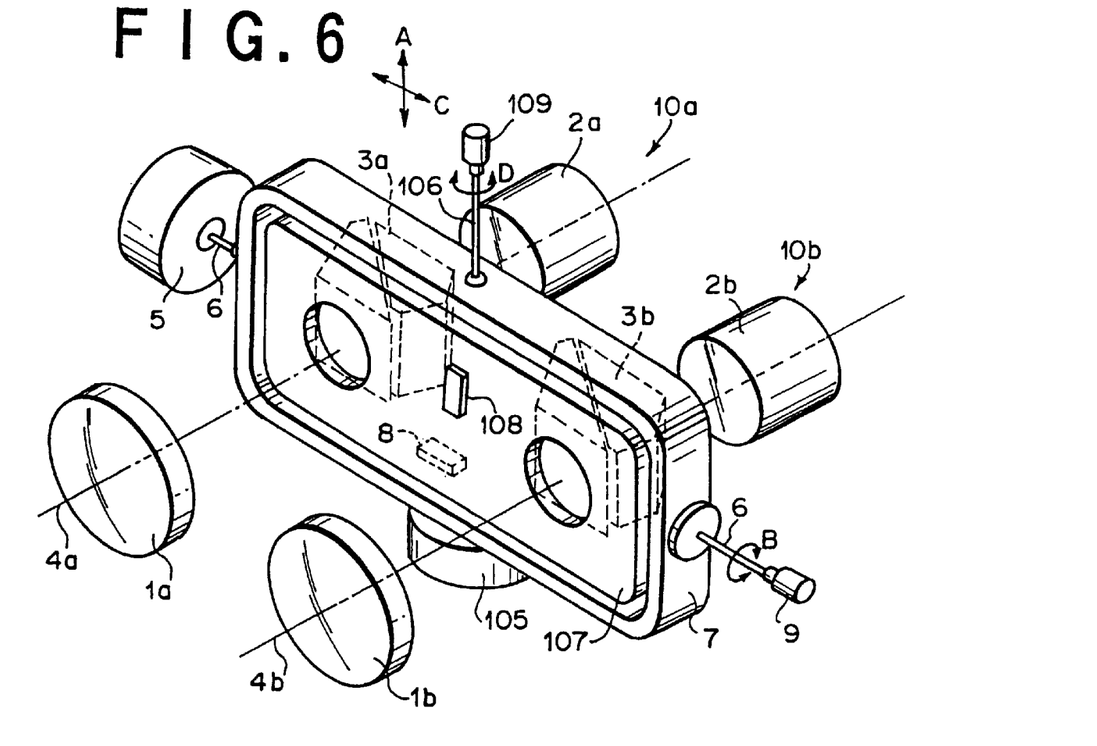
FIG. 6 is a schematic perspective view for explaining functions of the image stabilizing apparatus in accordance with the embodiment of the present invention.
Figure 7:
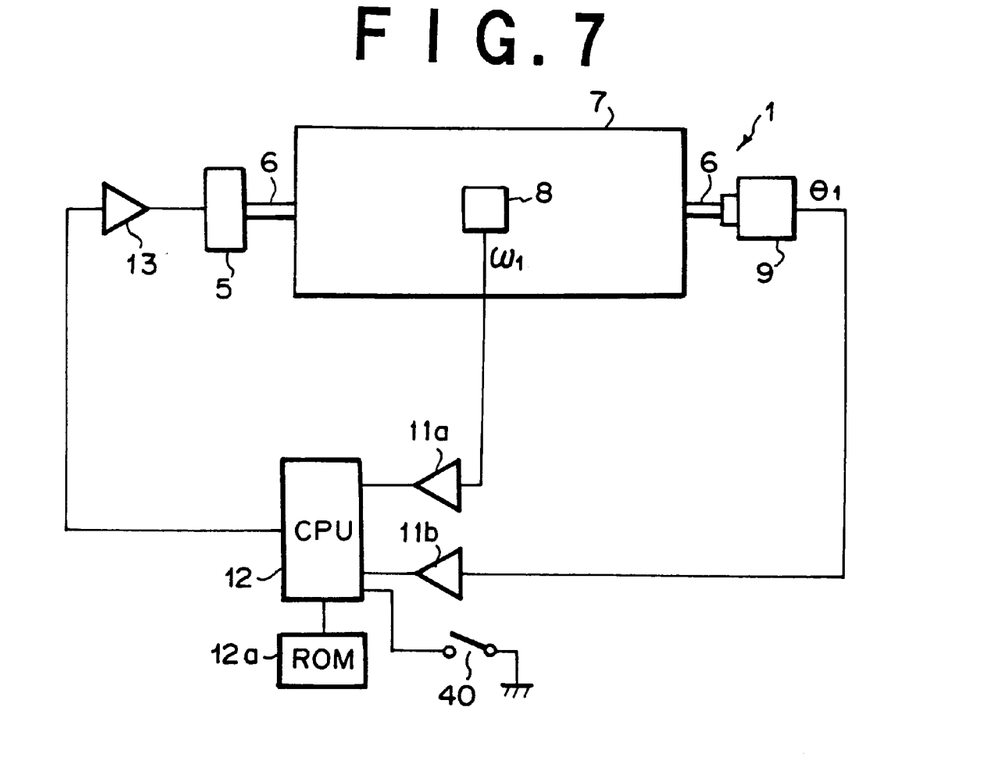
FIG. 7 is a block diagram for explaining functions of the image stabilizing apparatus in accordance with the embodiment of the present invention.

The optical apparatus attains a configuration of a common binocular system in the state where the gimbal suspension members 7, 107 having the above-mentioned erect prisms 3a, 3b attached thereto are fixed with respect to the case 30, i.e., where the erect prisms 3a, 3b attached to the gimbal suspension members 7, 107 are resultantly secured to the case 30, in FIG. 6. The respective optical axes 4a, 4b of the telescope optical systems 10a, 10b at this time will be referred to as optical axes of the optical apparatus.

Appropriate positions for disposing the objective lens systems 1a, 1b; erect prisms 3a, 3b; gimbal suspension members 7, 107; pivotal axes 6, 106; and the like are explained in detail in known literatures (e.g., Japanese Patent Publication No. 57-37852) and will not be repeated here.

In the apparatus of this embodiment, as shown in FIG. 6, the inner gimbal suspension member 107 is axially supported by the outer gimbal suspension member 7, so that the gimbal suspension device has an inner/outer double structure. While the outer gimbal suspension member 7 is pivoted by the pivotal axis 6 extending in the sidewise direction of the apparatus, so as to correct the blurring of images with respect to the vertical direction; the inner gimbal suspension member 107 is pivoted by the pivotal axis 106 extending in the vertical direction of the apparatus, so as to correct the blurring of images with respect to the sidewise direction. The erect prisms 3a, 3b are attached to the inner gimbal suspension member 107. In FIG. 6, the vertical relationship is shown opposite to that in FIGS. 2 to 5.

An angular velocity sensor 8 is secured to the center part of the upper wall portion of the outer gimbal suspension member 7, whereas an angular velocity sensor 108 is secured to the center part of the front wall portion of the inner gimbal suspension member 107. The angular velocity sensor 8 is a sensor which detects, when the outer gimbal suspension member 7 pivots in the direction of arrow B along with the vertical fluctuation of the case 30, its rotational angular velocity $\omega_1$. On the other hand, the angular velocity sensor 108 is a sensor which detects, when the inner gimbal suspension member 107 pivots in the direction of arrow D along with the sidewise fluctuation of the case 30, its rotational angular velocity.

For carrying out positional feedback control in addition to the velocity feedback control based on the detected angular velocity, a position sensor 9 for detecting the rotational angle $\theta_1$ of the pivotal axis 6 is attached to one end of the pivotal axis 6. Attached to the other end of the pivotal axis 6 is a rotary motor 5 for pivoting the pivotal axis 6 of the gimbal suspension member 7 so as to cause the erect prisms 3a, 3b to always restore their initial postures against the fluctuation of the case 30 according to the detected values from the angular velocity sensor 8 and position sensor 9. On the other hand, for carrying out positional feedback control in addition to the velocity feedback control based on the detected angular velocity, a position sensor 109 for detecting the rotational angle of the pivotal axis 106 is attached to one end of the pivotal axis 106. Attached to the other end of the pivotal axis 106 is a rotary motor 105 for pivoting the pivotal axis 106 of the gimbal suspension member 107 so as to cause the erect prisms 3a, 3b to always restore their initial postures against the fluctuation of the case 30 with respect to the sidewise direction according to the detected values from the angular velocity sensor 108 and position sensor 109.

A basic concept of control loop in the apparatus of this embodiment will now be explained with reference to FIG. 7. As depicted, this apparatus comprises amplifiers 11a, 11b for amplifying the angular velocity signal from the angular velocity sensor 8 and the angular signal from the position sensor 9, respectively; a CPU 12 for computing the amount of driving of the rotary motor 5 so as to cause the erect prisms 3a, 3b to restore their original postures according to the angular velocity signal and angular signal and outputting a control signal based on this computation; and a motor driving circuit 13 for amplifying the control signal from the CPU 12 and driving the rotary motor 5. The driving control of the rotary motor 5 in the CPU 12 is carried out by PWM (Pulse Width Modulation) control which is excellent in response and favorable in terms of power utilization efficiency.

Connected to the CPU 12 are a ROM 12a storing various kinds of programs, and the gain changeover instruction switch 40 for instructing the CPU 12 to change the gain in the control loop. As with the detected signals from the angular velocity sensor 8 and position sensor 9, the detected signals from the angular velocity sensor 108 and position sensor 109 are converted into a control signal by a control loop similar to that shown in FIG. 7, and the rotary motor 105 is driven by this control signal.

Therefore, while two sets of control loops are necessary for causing the two, i.e., inner and outer, gimbal suspension members 7, 107 to restore their original postures in the apparatus of this embodiment, the CPU 12 may be used in common.

Figure 1:
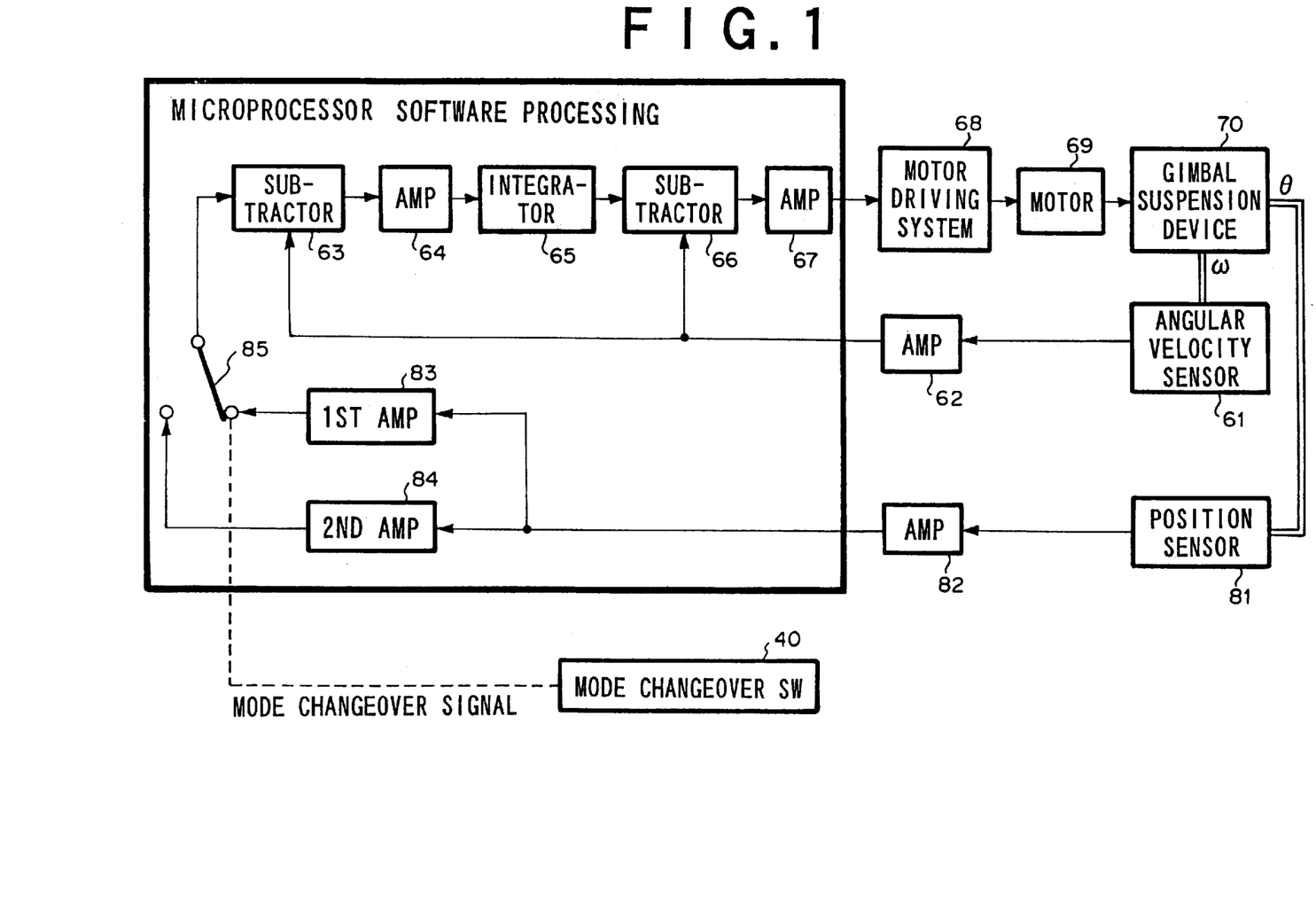
FIG. 1 is a block diagram showing a control loop of the image stabilizing apparatus in accordance with an embodiment of the present invention.
Figure 2:
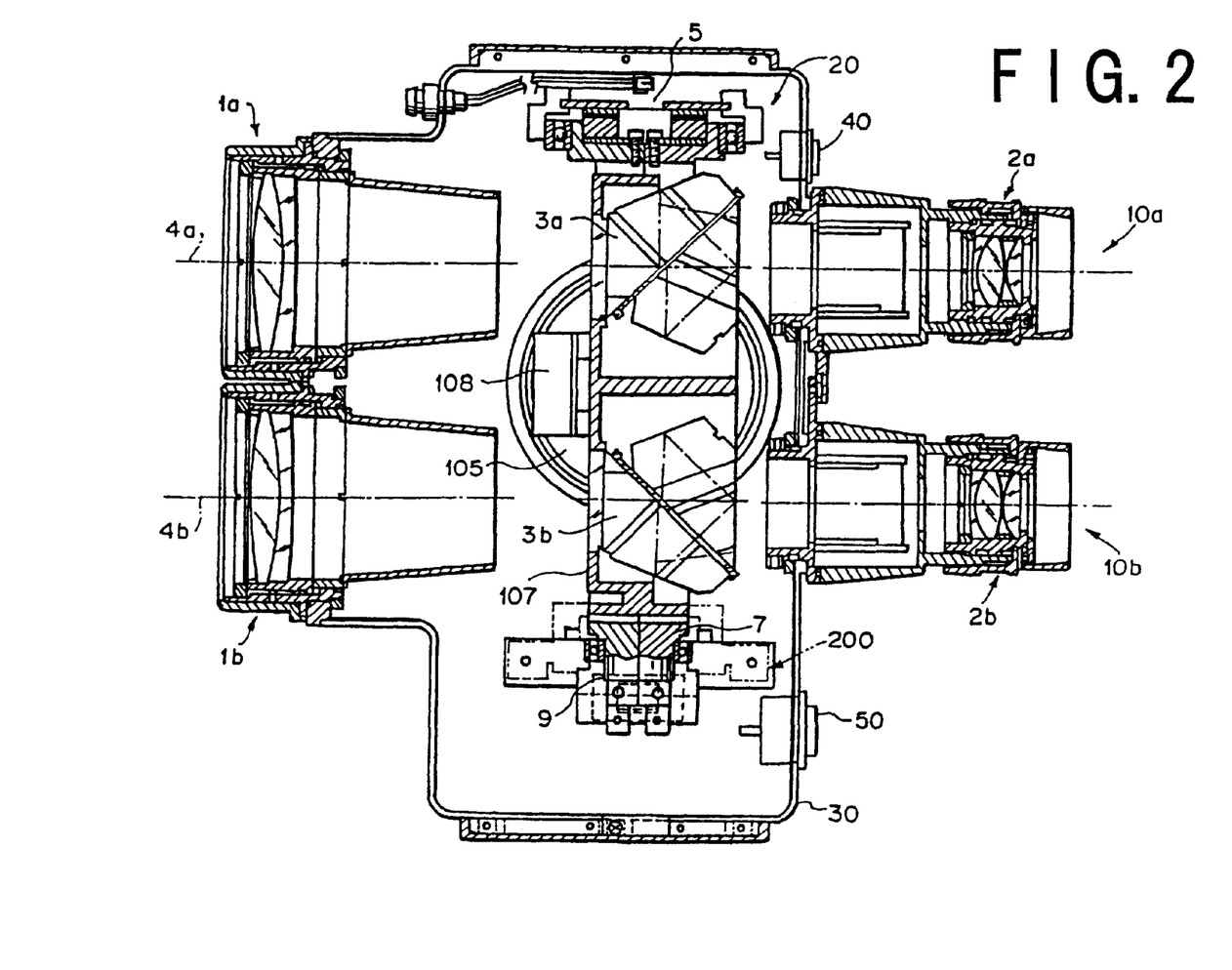
FIG. 2 is a sectional view, taken along a horizontal plane, showing binoculars incorporating therein the image stabilizing apparatus in accordance with the embodiment of the present invention.
Figure 3:
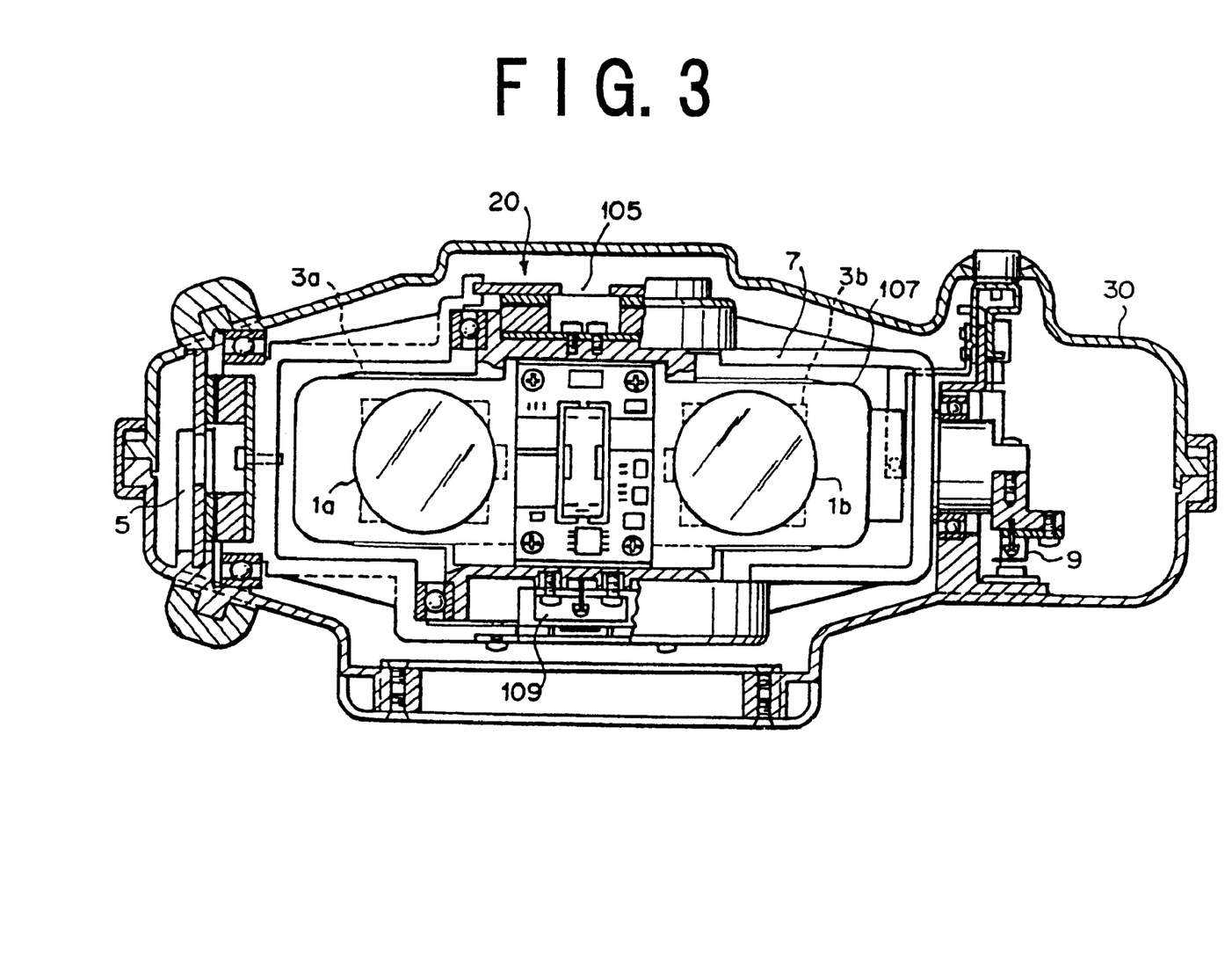
FIG. 3 is a frontal sectional view showing the binoculars incorporating therein the image stabilizing apparatus in accordance with the embodiment of the present invention.
Figure 4:
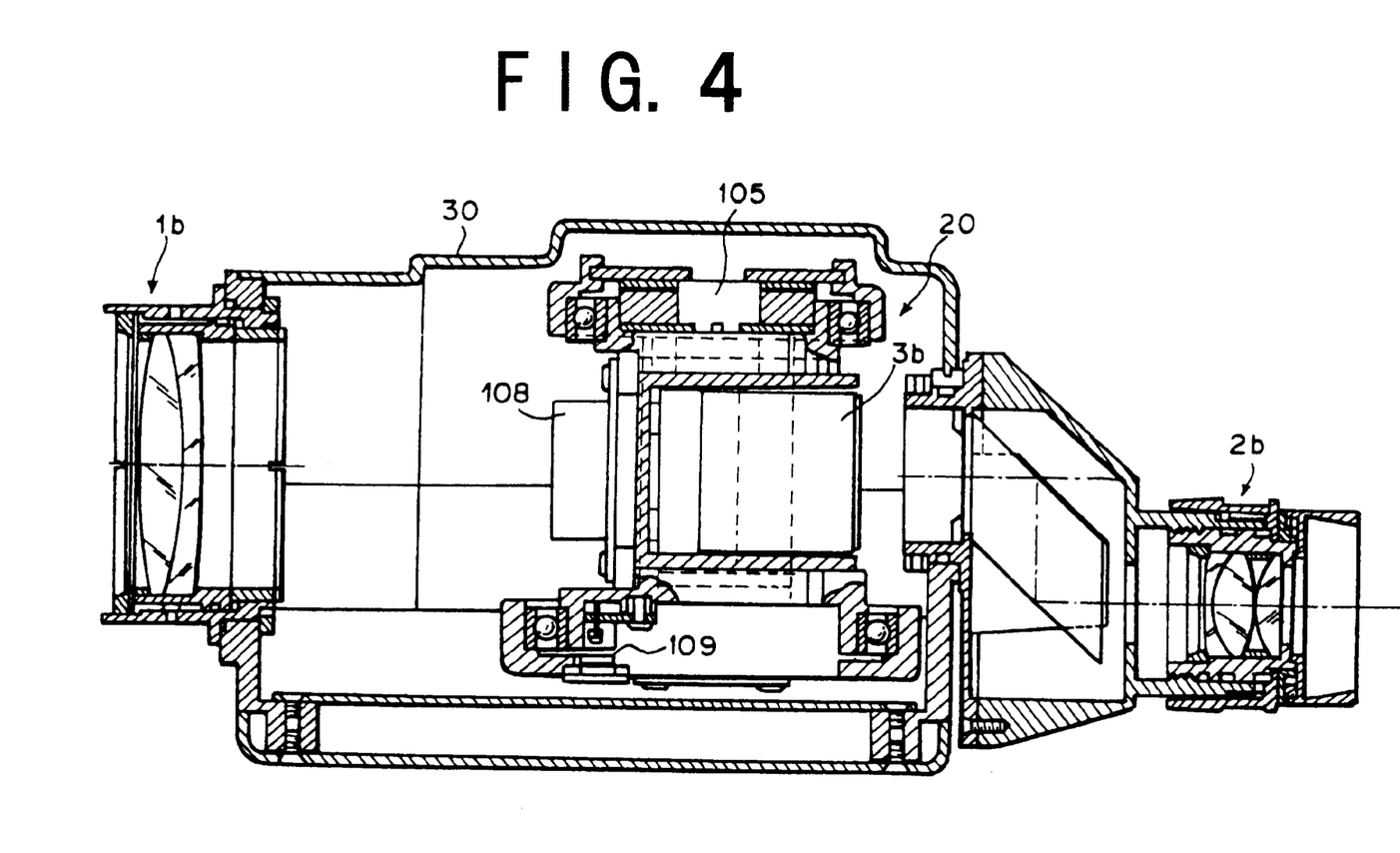
FIG. 4 is a lateral sectional view showing the binoculars incorporating therein the image stabilizing apparatus in accordance with the embodiment of the present invention.
Figure 5:
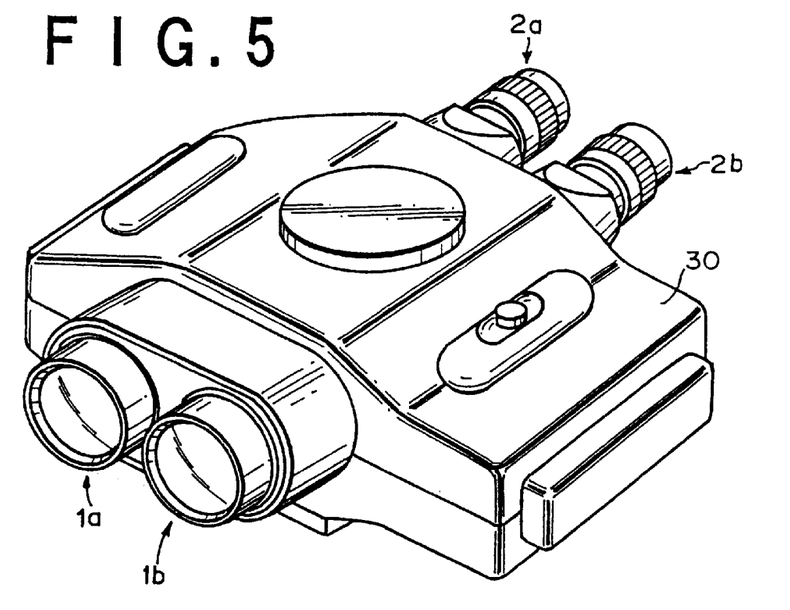
FIG. 5 is a perspective view showing the binoculars incorporating therein the image stabilizing apparatus in accordance with the embodiment of the present invention.

A detailed configuration of the control loop will now be explained with reference to FIG. 1.

This control loop is constituted by two feedback loops, i.e., a velocity (angular velocity) feedback loop and a positional (angle) feedback loop. Also, this control loop is constituted by a combination of a software loop constructed by microprocessor programs in the CPU 12, and a hardware loop.

First, the velocity feedback loop detects the angular velocity $\omega$ of a gimbal suspension device 70 (7, 107) about the pivotal axis 6, 106 with an angular velocity sensor 61 (8, 108). Thus detected value $\omega$ is amplified by a hardware amplifier 62 and then is negatively fed back to a motor driving system 68 (first velocity feedback loop). As a consequence, an opposite rotational torque is generated in a motor 69, whereby control is effected such that the gimbal suspension device 70 restores its original posture against vibrations such as camera shake, i.e., the erect prisms 3a, 3b are secured with respect to the earth (inertial system) against vibrations with a large angular velocity.

Also, in this velocity feedback loop, the value detected by the angular velocity sensor 61 is fed into an integrator 65 by way of a subtractor 63 and an amplifier 64. Then, in a subtractor 66, the detected value directly fed from the amplifier 62 is subtracted from the output value of the integrator 65, and the result of subtraction is amplified by amplifier 67 and negatively fed back to the motor driving system 68 (second velocity feedback loop). Since the value detected by the angular velocity sensor 61 is negatively fed back by way of the integrator 65, the control system can function even when the offset is zero with respect to a velocity command, i.e., when a velocity input value and a velocity output value of the feedback loop are identical to each other. Also, since the loop gain can be duplexed, the gimbal suspension device 70 can be stabilized at a higher speed (stabilizing accuracy can be raised).

The integrator 65 functions to average input values, whereas its output value is subjected to subtraction with the detected angular velocity value in the subtractor 66. Therefore, the integrator 65 can be considered to have a damper function for preventing the first velocity feedback loop from oscillating.

On the other hand, the position feedback loop detects the angular position $\theta$ of the gimbal suspension device 70 about the pivotal axis 6, 106 with a position sensor 81 (9, 109), amplifies thus detected value with a hardware amplifier 82, and then sends back thus amplified value to the motor driving system 68, thereby controlling the rotary motor 69 (5, 105) such that the gimbal suspension device 70 approaches the angular position $\theta_0$ of the midpoint on the collimation axis.

There are cases where optical apparatus such as binoculars are greatly panned or tilted. When the above-mentioned velocity feedback loop is used alone for control in such cases, its response to panning or tilting is unfavorable, whereby the gimbal suspension device 70 may pivot so greatly that it collides with the case 30 at a movable limit portion thereof.

Therefore, if it is detected that the gimbal suspension device 70 has pivoted greatly in this position feedback loop, then a signal corresponding to the detected value is amplified by amplifier 67 and sent back to the motor driving system 68, whereby the motor 69 is driven so as to powerfully return the gimbal suspension device 70 toward the midpoint on the collimation axis. As a consequence, upon panning, tilting, and the like, the gimbal suspension device 70 is prevented from unexpectedly colliding with the case 30 at movable limit portions thereof, and its tracking characteristic is made favorable when carrying out panning or tilting.

This position feedback loop is configured such that the detected signal from the position sensor 81 is basically fed back by way of a first amplifier 83. The amplification factor of the first amplifier 83 has such a linear characteristic that it gradually increases as the pivoting angle of the gimbal suspension device 70 enhances, whereas the gradient of this linear characteristic is set to a relatively small value. Namely, the first amplifier 83 is set so as to suppress the gain of position feedback loop (position gain) to a relatively low level, thereby yielding a mode (anti-vibration mode) attributing more importance to anti-vibration performances.

When binoculars are used in practice, flying objects such as birds and airplanes are often observed while being tracked. Fast pan/tilt operations, fast panning in particular, are required in such a case. Since it is necessary for the optical system in the apparatus to smoothly track the observation object in its moving direction, such a panning operation necessitates a function contradictory to the above-mentioned anti-vibration function for securing the optical system to its original position. Hence, it is rather necessary to nullify the above-mentioned anti-vibration function when carrying out such a pan/tilt operation.

Therefore, this embodiment is configured such that a second amplifier 84 having a higher amplification factor is disposed within the position feedback loop in parallel with the first amplifier 83 having a lower amplification factor, whereas the first amplifier 83 and second amplifier 84 can be switched therebetween by a software switch section 85. While the amplification factor of the second amplifier 84 has such a linear characteristic that it gradually increases as the pivoting angle of the gimbal suspension device 70 enhances, the gradient of this linear characteristic is set to a value much greater than that in the first amplifier 83.

The changeover of the software switch section 85 is carried out when the operator switches the mode changeover switch 40 on the back side of the case 30 in response to circumstances. When the software switch section 85 is connected to the second amplifier 84, the position gain is set greater, whereby a mode (panning mode) attributing more importance to tracking performances is attained.

The driving control of the rotary motor 5 effected by the CPU 12 will now be explained.

Figure 9:
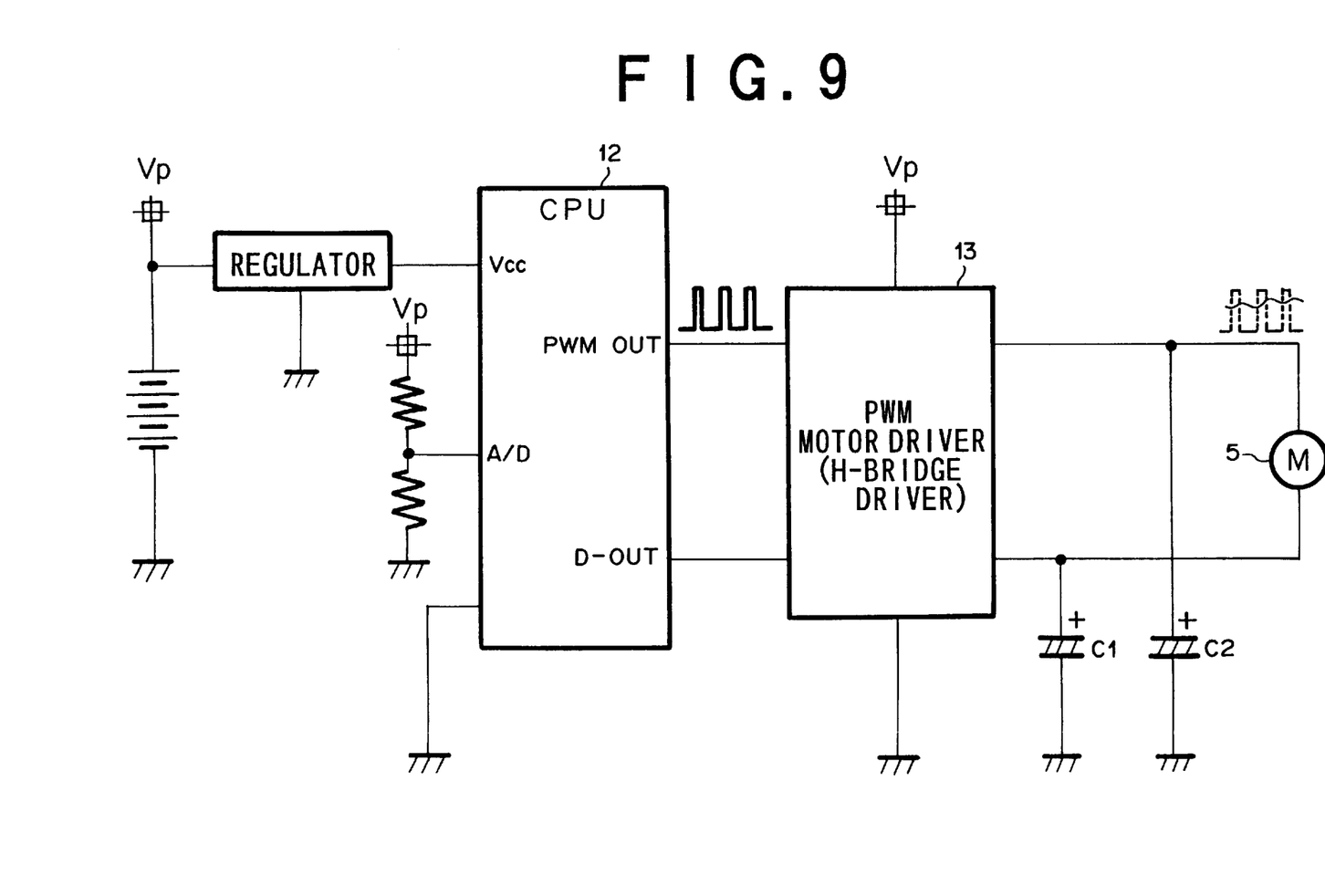
FIG. 9 is a circuit diagram showing contents of PWM control in the image stabilizing apparatus in accordance with the embodiment of the present invention.
Figure 10:
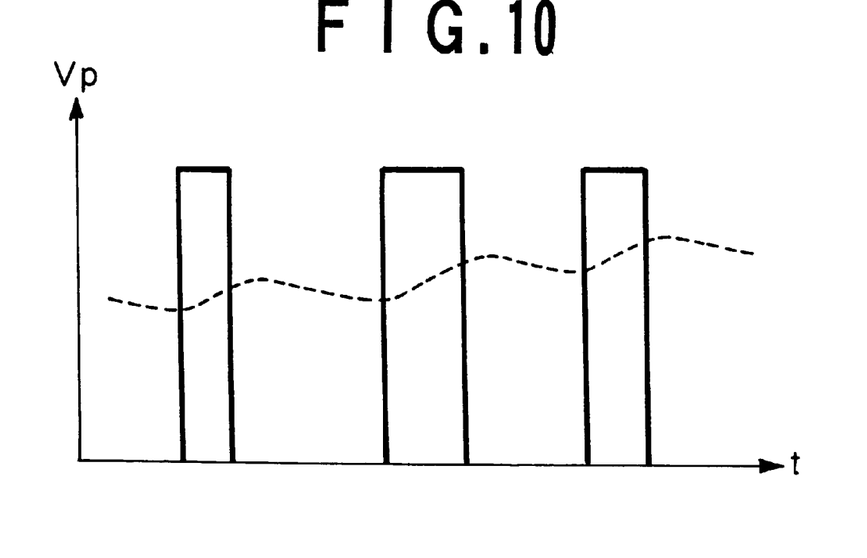
FIG. 10 is a waveform chart showing contents of PWM control in the image stabilizing apparatus in accordance with the embodiment of the present invention.

As mentioned above, the rotary motor 5 is driven under PWM control by way of the motor driving circuit 13. FIGS. 9 and 10 are a circuit diagram and waveform chart showing the contents of PWM control in an easily understandable manner, respectively.

As shown in these drawings, the CPU 12 generates a pulse waveform and outputs it to the motor driving circuit 13, whereas the motor driving circuit 13 drives the rotary motor 5 with a power corresponding to the pulse width of the output waveform. Since capacitors C1 and C2 are connected to both terminals of the rotary motor 5, respectively, the voltage actually applied to the rotary motor 5 has a waveform indicated by the broken curve in FIG. 10.

While a power voltage $V_p$ is supplied to the motor driving circuit 13, the power voltage $V_p$ gradually drops as a battery is used. If the power voltage $V_p$ drops as such, then the power for driving the rotary motor 5 decreases, whereby the aimed pivoting control cannot be carried out.

Figure 11:
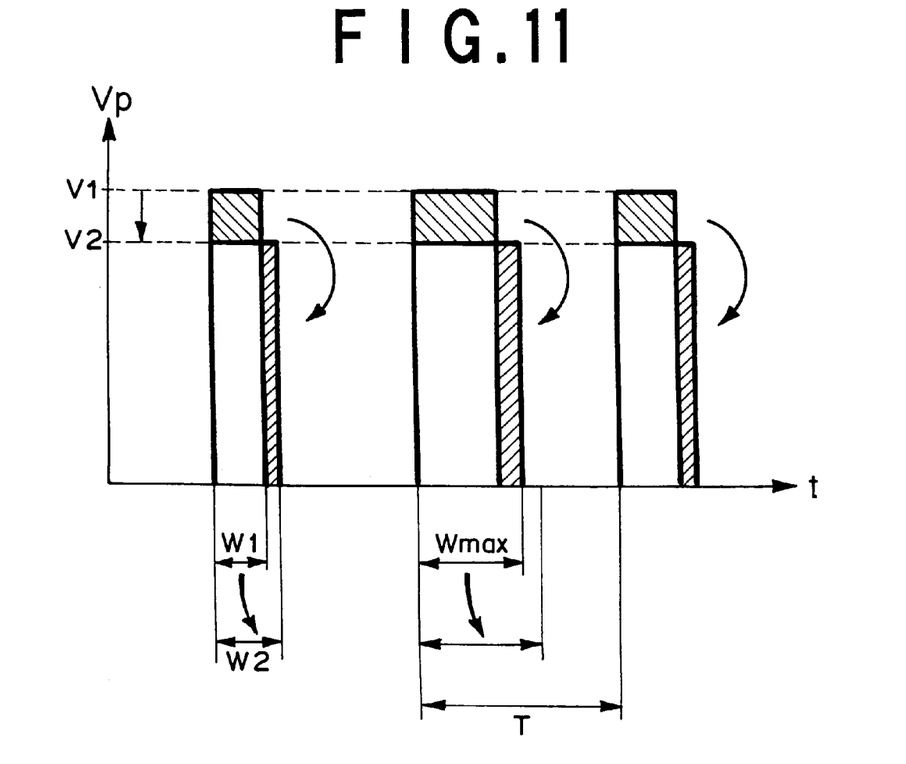
FIG. 11 is a waveform chart showing how the pulse width is corrected in the image stabilizing apparatus in accordance with the embodiment of the present invention.

Therefore, when the power voltage $V_p$ of the motor driving circuit 13 drops in this embodiment, the CPU 12 enhances the pulse width of the waveform outputted from the CPU 12 to the motor driving circuit 13 as shown in FIG. 11.

Namely, while the power voltage $V_p$ is fed as a constant voltage $V_{cc}$ (5 V) into the CPU 12 by way of the regulator, the power voltage $V_p$ is read out by the CPU 12 at its A/D terminal. If the read-out power voltage $V_p$ drops to a voltage $V_2$ lower than its rated voltage $V_1$, then the pulse width of output waveform is corrected so as to increase from $W_1$ to $W_2$ according to the amount of drop. The increasing rate $(W_2/W_1)$ at this time is set to the reciprocal $(V_1/V_2)$ of drop rate of the power voltage $V_p$.

Also, in this embodiment, a maximum limit value $W_{max}$ is set for the pulse width of output waveform, whereas the CPU 12 enhances the maximum limit value $W_{max}$ when the power voltage $V_p$ of the motor driving circuit 13 drops. The maximum limit value $W_{max}$ is set to ½ of the period T of the waveform outputted from the CPU 12, whereas its correction rate is set to the same value as the increasing rate $(W_2/W_1)$ of pulse width.

As explained in detail in the foregoing, while the rotary motor 5 is driven by the CPU 12 under PWM control by way of the motor driving circuit 13, if the power voltage $V_p$ of the motor driving circuit 13 drops as the battery is used, then the pulse width of output waveform is corrected by the CPU 12 so as to increase in response to the drop. Therefore, the actuator driving power can be kept from decreasing, so as to carry out the aimed pivoting control in this embodiment.

Also, since the increasing rate $(W_2/W_1)$ of pulse width is set to the reciprocal $(V_1/V_2)$ of drop rate, an appropriate actuator driving power can be obtained in response to the drop in power voltage $V_p$.

Figure 12:
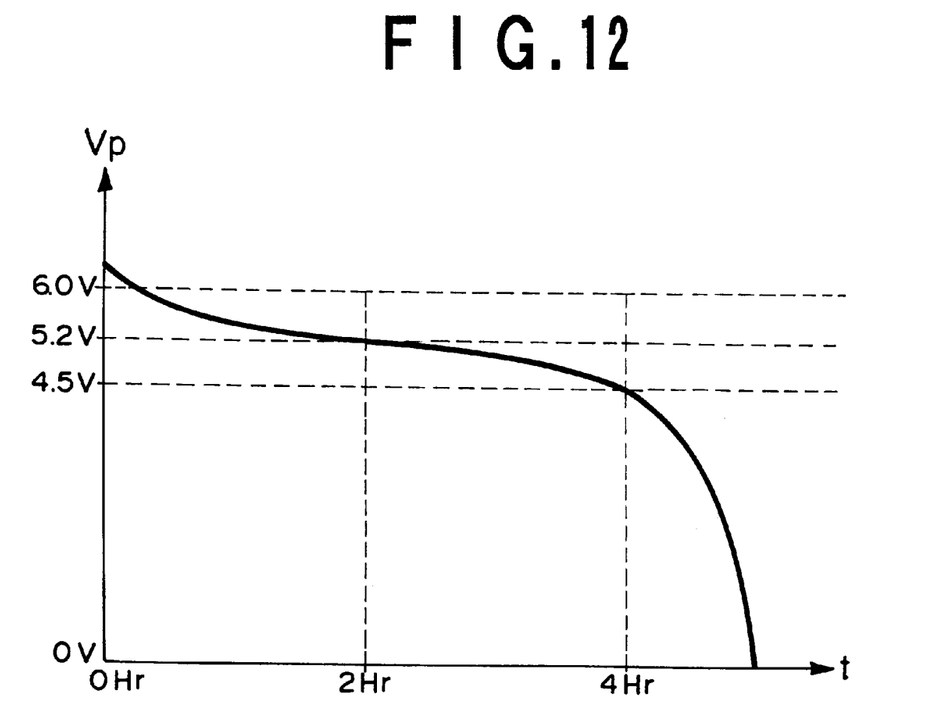
FIG. 12 is a chart showing how the power voltage changes as a battery is used in the image stabilizing apparatus in accordance with the embodiment of the present invention.

FIG. 12 is a chart showing how the power voltage $V_p$ changes as a battery is used in the case where a battery power source comprising four AA alkaline cells in series is employed in the image stabilizing apparatus of this embodiment.

As depicted, in such a battery power source, the power voltage $V_p$ gradually drops from a voltage slightly higher than its rated voltage of 6 V as it is used, so as to become about 5.2 V in two hours and about 4 V in four hours, and drastically drops thereafter.

If the pulse width is not corrected so as to increase, then only about two hours of battery life are assured since a driving voltage of at least about 5.2 V is required for driving the rotary motor 5. In this embodiment, by contrast, the pulse width is enhanced in response to the drop in power voltage $V_p$, whereby the rotary motor 5 can fully be driven even at a driving voltage of about 4.5 V. Therefore, the battery life can greatly be elongated in accordance with this embodiment.

Also, in this embodiment, the maximum limit value $W_{max}$ is corrected by the CPU 12 so as to increase when the power voltage $V_p$ of the motor driving circuit 13 drops. Therefore, it is possible to reduce the fear of the enhanced pulse width $W_2$ exceeding the maximum limit value $W_{max}$ and thus being limited thereby. Since the correction rate of the maximum limit value $W_{max}$ is set to the same value as the increasing rate $(W_2/W_1)$ of pulse width in particular, the pulse width $W_2$ would not exceed the maximum limit value $W_{max}$, whereby a required actuator driving power can always be secured in this embodiment.

Figure 8:
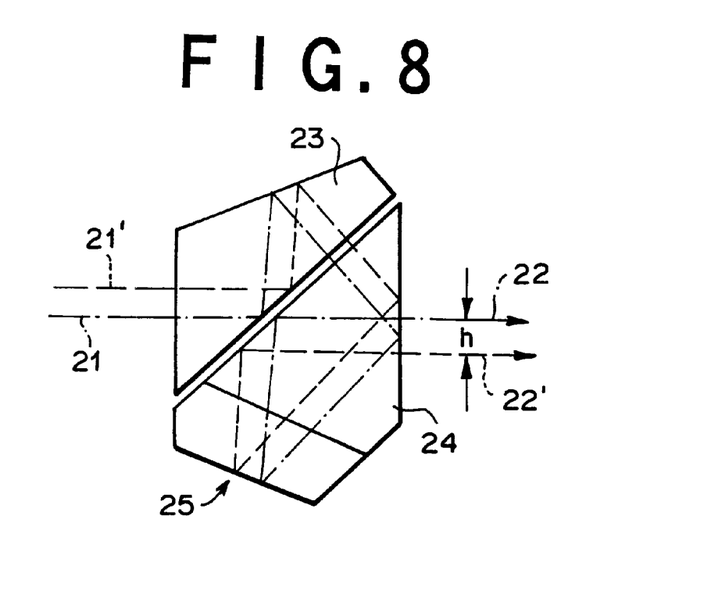
FIG. 8 is a side view for explaining an erect prism shown in FIG. 2.

Examples of the erect prisms 3a, 3b include Schmidt erect prisms, Abbe erect prisms, bauern fend erect prisms, porro erect prisms, and roof erect prisms. Among them, FIG. 8 shows a Schmidt erect prism. The Schmidt erect prism is constituted by prisms 23, 24 as depicted, whereas a part 25 of the prism 24 acts as a roof reflecting surface. In such an erect prism, there exists a position on the entrance optical axis where the entrance optical axis 21 and the exit optical axis 22 can be formed on the same line as depicted. Such an erect prism in which the entrance optical axis 21 and exit optical axis 22 can be formed on the same line has such a property that, as shown in FIG. 8, a light beam 21' which is parallel to the optical axis 21 and separated upward from the optical axis 21 by h becomes, after passing through the erect prism, a light beam 22' which is parallel to the optical axis 22 and separated downward from the optical axis 22 by h.

The angular velocity sensor 8, 108 is a piezoelectric vibrating gyro sensor comprising a columnar vibrator which is shaped like a cylinder or the like and a plurality of piezoelectric ceramic pieces and utilizing Coriolis force, in which at least two piezoelectric ceramic pieces for detection and at least one piezoelectric ceramic piece for feedback are disposed on a side face of the columnar vibrator.

The piezoelectric ceramic pieces for detection output respective detected signals having values different from each other depending on the vibration. When their difference is computed, an angular velocity is obtained.

The piezoelectric ceramic for feedback is used for correcting the phase of detected signals.

Since the angular velocity sensor 8, 108 has a simple structure and a very small size, the image stabilizing apparatus 20 itself can attain a simple structure and a very small size. Also, since it has a high S/N ratio and a high precision, the angular velocity control can attain a high accuracy.

The image stabilizing apparatus of the present invention is not limited to the one in accordance with the above-mentioned embodiment, and can be modified in various manners. For example, as the angular velocity information detecting means, not only the piezoelectric vibrating gyro sensor of a columnar vibrator type, but also piezoelectric vibrating gyro sensors of various types such as a triangular prism vibrator type, a quadrangular prism vibrator type, and a tuning-fork-shaped vibrator type can be used. Further, various kinds of other angular velocity sensors can be used.

As the angular position detecting means, various angular sensors such as resolver, synchro, rotary encoder, and the like can also be used in place of the above-mentioned position sensor.

Though the apparatus of the above-mentioned embodiment has a configuration to be employed in binoculars, the image stabilizing apparatus of the present invention can have a configuration applicable to a monocular as well. Also, similar effects can be obtained when the apparatus is mounted to a camera such as video camera.

While the image stabilizing apparatus of the present invention is configured such that the actuator for pivoting the gimbal suspension means is driven under PWM control by way of a driving circuit, the pulse width of waveform outputted to the driving circuit is corrected so as to increase when the power voltage of the driving circuit drops while the apparatus is in use, whereby the actuator driving power can be prevented from decreasing, so as to carry out the aimed pivoting control.

What is claimed is:

1. An image stabilizing apparatus mounted in an optical apparatus having a monocular or binocular optical system in which an erect prism is disposed between an objective lens and an eyepiece, whereas said objective lens and eyepiece of said optical system are secured within a case;

said image stabilizing apparatus comprising:
gimbal suspension means, adapted to pivotally attach said erect prism to said case, having two pivotal axes extending sidewise and vertical directions of said optical apparatus, respectively;
an actuator for pivoting said gimbal suspension means about said two pivotal axes;
pivoting control means for driving said actuator under PWM control by way of a driving circuit and controlling said pivoting of said gimbal suspension means about said two pivotal axes so as to fix said erect prism with respect to an inertial system; and
pulse width correcting means for enhancing, when a power voltage of said driving circuit drops, a pulse width of a waveform outputted from said pivoting control means to said driving circuit.

2. An image stabilizing apparatus according to claim 1, wherein a correction rate of said pulse width is set to the reciprocal of drop rate of said power voltage.

3. An image stabilizing apparatus according to claim 1, wherein a maximum limit value is set for said pulse width, said image stabilizing apparatus further comprising maximum limit value correcting means for enhancing said maximum limit value when said power voltage of said driving circuit drops.

4. An image stabilizing apparatus according to claim 3, wherein a correction rate of said maximum limit value is set to the same value as a correction rate of said pulse width.

* * * * *